United States Patent [19]

Johnson

[11] 3,974,909

[45] Aug. 17, 1976

[54] TILTING TRAY SORTING CONVEYOR

[75] Inventor: Richard B. Johnson, Mount Airy, Md.

[73] Assignee: American Chain & Cable Company, Inc., Bridgeport, Conn.

[22] Filed: Aug. 22, 1975

[21] Appl. No.: 606,935

[52] U.S. Cl. ............................ 198/155; 105/272; 198/38; 214/11 R
[51] Int. Cl.² ..................................... B65G 15/00
[58] Field of Search .................. 198/155, 181, 38; 105/270, 272; 214/11 R

[56] References Cited
UNITED STATES PATENTS

| | | | |
|---|---|---|---|
| 269,663 | 12/1882 | Grafton | 105/272 |
| 3,167,192 | 1/1965 | Harrison et al. | 198/38 |
| 3,265,190 | 8/1966 | Boehm | 198/384 |
| 3,589,501 | 6/1971 | Harrison | 198/155 |
| 3,669,245 | 6/1972 | Wooten et al. | 198/155 |

*Primary Examiner*—Evon C. Blunk
*Assistant Examiner*—Douglas D. Watts
*Attorney, Agent, or Firm*—Barnes, Kisselle, Raisch & Choate

[57] ABSTRACT

A tilting tray sorting conveyor comprising a track, a plurality of carriers on said track, a conveyor interconnecting said carriers and adapted to be driven to move said carriers along said track. Each carrier has a tray pivotally mounted thereon about an axis generally parallel to said track and a tilting yoke fixed thereto. Cam means along said track engage the tilting yoke and move said yoke in one direction to tilt said tray to one side and move said yoke in the other direction to tilt said tray to the opposite side of the track. Latch means are operable to hold said tray in normal upright position or to permit the tray to be tilted to one side or the other of said track. The latch means includes an escapement member mounted for generally vertical movement on the carriage and means yieldingly urging said escapement member to a neutral position corresponding to the upright position of said tray.

Interengaging means are provided between the escapement member and the tray such that when the escapement member is in neutral position, the tray is maintained in upright position, when the escapement member is moved in one direction from neutral, the tray is permitted to tilt to one side of the track, and when the escapement member is moved in the other direction from neutral, the tray is permitted to tilt to the opposite side of the track.

8 Claims, 7 Drawing Figures

TILTING TRAY SORTING CONVEYOR

This invention relates to tilting tray sorting conveyors and particularly to means for latching and unlatching said trays for tilting to one side or the other of the track.

BACKGROUND OF THE INVENTION

One type of conveyor commonly used in the handling of articles is called a tilting tray sorting conveyor and comprises a track along which a plurality of carriers are moved by a conveyor. Each carrier has a tray pivotally mounted thereon about an axis generally parallel to the track and means are commonly provided for tilting the carrier to one side or the other of the track to dump the article thereon to predetermined positions along the path of the carrier.

Among the objects of this invention are to provide a novel tilting tray conveyor system wherein the trays are positively latched in neutral position and are readily unlatched to permit tilting selectively in one direction or the other and are positively relatched in neutral position when they are re-established to the upright position; and wherein the mechanism is simple, positive and utilizes a minimum number of parts.

SUMMARY OF THE INVENTION

In accordance with the invention, the latch mechanism comprises an escapement member mounted for generally vertical movement on the carriage and means yieldingly urging the escapement member to a neutral position corresponding to the upright position of the tray. Interengaging means are provided between said escapement member and said tray such that when the escapement member is in neutral position, the tray is maintained in upright position, when the escapement member is moved in one direction, the tray is permitted to tilt to one side of the track, and positively relatched into upright position when it is re-established to upright position; and when the escapement member is moved in the other direction from neutral, the tray is permitted to tilt to the opposite side of the track and is positively relatched into upright position when it is re-established to the upright position.

DESCRIPTION

Figure 1:
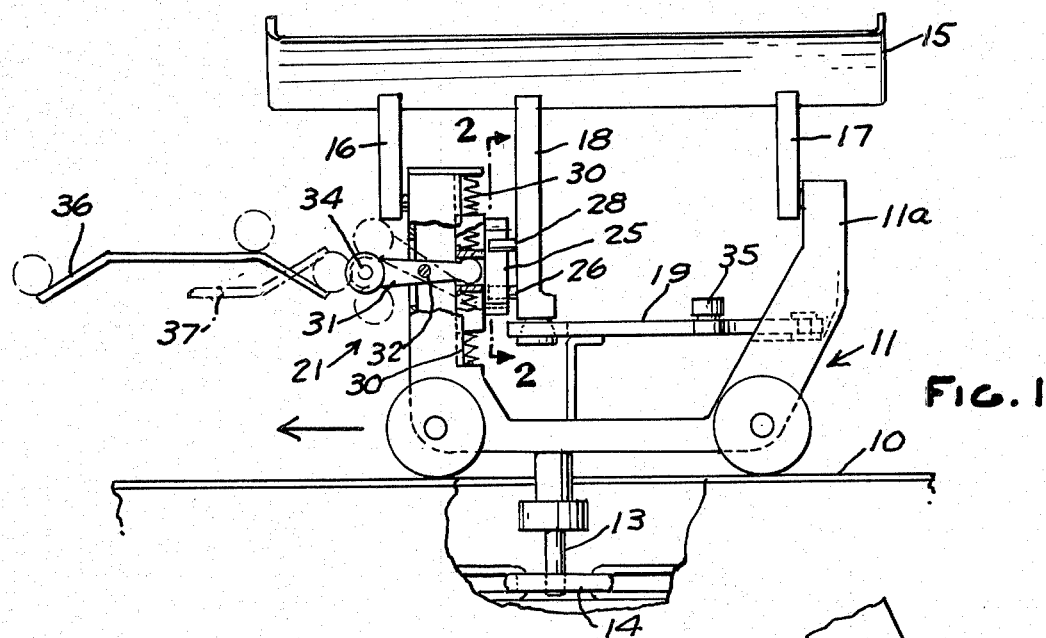
FIG. 1 is a part sectional side elevational view of a tilting tray conveyor system embodying the invention.

Referring to FIG. 1, a typical tilting tray sorting conveyor system comprises a track 10 along which wheeled carriers 11 are moved by a chain 12 having interengaging means with the carrier such as a pin 13 engaging a recess or opening 14 in a link of the chain.

Each carrier includes a tray 15 that is pivoted by brackets 16, 17 to a carriage 11a about a generally horizontal axis extending in the path of the carriers.

Each tray 15 includes a downwardly extending yoke 18 that engages a plate 19 slidable transversely upon engagement with cams 20 positioned along the path to move the tray and tilt to one side or the other of the track as may be desired to deliver articles to selected portions along the path of the carriers.

The movement of the tray to one side or the other is controlled by a latching mechanism 21 that includes an escapement member 23 mounted for vertical movement on the carriage 11a. Escapement member 23 is generally U-shaped in cross section and includes an actuator 24 that is generally Z-shaped including a central portion 25 that extends generally vertically, an upper laterally extending portion 26, and a lower laterally extending portion 27 extending in the opposite direction from portion 26.

Figure 2:
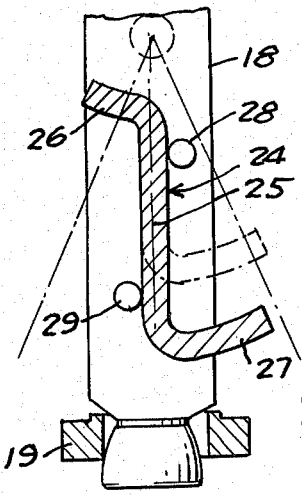
FIG. 2 is a fragmentary sectional view on an enlarged scale taken along the line 2—2 in FIG. 1.

Horizontally extending pins 28, 29 are provided on the yoke 18 and when the actuator 24 is in neutral position, the pins 28, 29 engage opposite sides of the central portion 25 as shown in FIG. 2.

Opposed springs 30 yieldingly urge the actuator to a neutral position.

An actuating lever 31 is pivoted at 32 to the carriage and has one end engaging an opening 33 in the escapement member 23. A horizontal shaft 34 is provided on the other end of lever 31 and has cam followers 35 thereon for engagement with cams 36, 37 positioned selectively along the path of the carriers. Cam 36 is adapted to engage a cam follower 35 and move the escapement member 23 downwardly while cam 37 is adapted to engage the other cam follower 35 and move the escapement member 23 upwardly. The cams 20, 36, 37 may be fixed along the path or selectively movable into and out of the path of the cam followers as may be required or desired.

Figure 3:
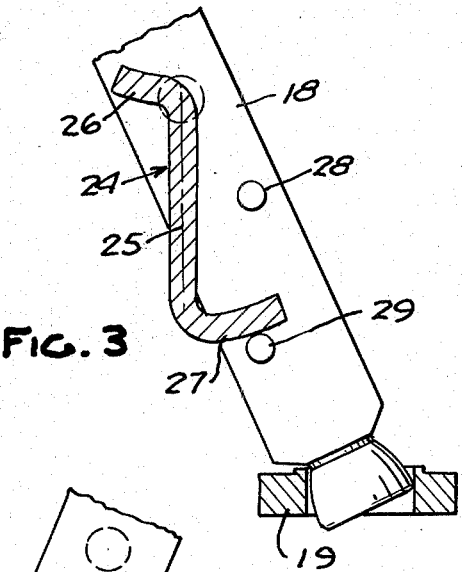
FIG. 3 is a view similar to FIG. 2 showing the parts in a different operative position.
Figure 5:
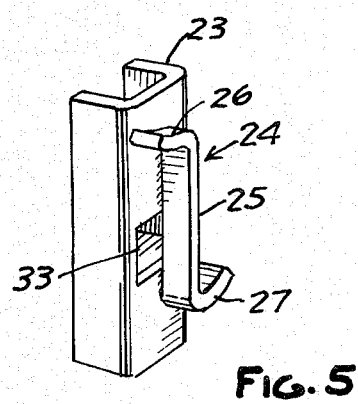
FIG. 5 is a perspective view of a part of the system.
Figure 4:
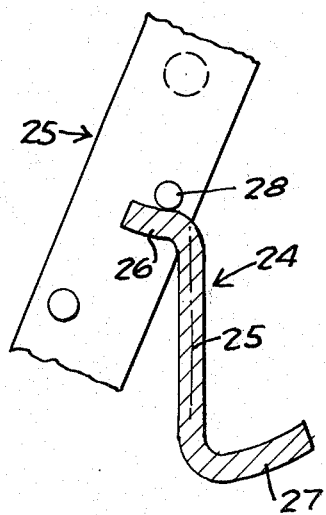
FIG. 4 is a view similar to FIGS. 2 and 3 showing the parts in a different operative position.
Figure 6:
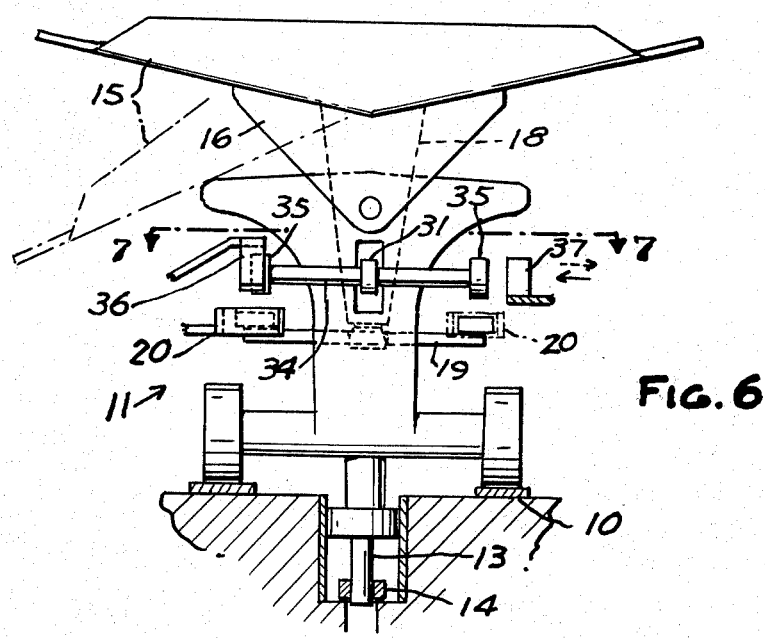
FIG. 6 is a front view of the system shown in FIG. 1.
Figure 7:
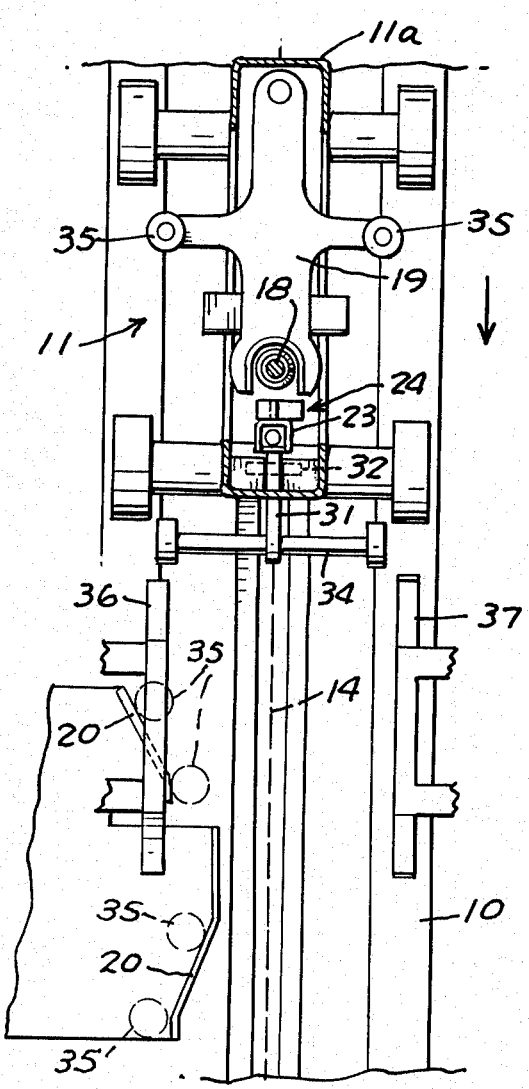
FIG. 7 is a fragmentary sectional view taken along the line 7—7 in FIG. 6.

As shown in FIG. 2, in the neutral position of the actuator 24, the pins 28, 29 engage the central portion 25 and hold the tray in upright position. When the escapement device is moved upwardly as shown in FIG. 3, the actuator 24 is moved relative to the yoke 18 such that the pin 29 clears the lower portion 27 of actuator 24 so that the yoke and, in turn, the tray may tilt counterclockwise as viewed in FIG. 3. When the escapement device 23 is moved upwardly, the actuator 24 is moved relative to the yoke 18 such that the pin 28 clears the upper end of the portion 26 so that the yoke 18 and, in turn, the tray may pivot clockwise as viewed in FIG. 4.

It can thus be seen that there has been provided a simple, effective latching mechanism that is operable to hold the tray in upright position or selectively permit tilting of the tray to one side or the other of the track.

I claim:

1. In a tilting tray sorting conveyor, the combination comprising
   a track,
   a plurality of carriers on said track,
   a conveyor interconnecting said carriers and adapted to be driven to move said carriers along said track,
   each said carrier having a tray pivotally mounted thereon about an axis generally parallel to said track,
   each said tray having a tilting yoke fixed thereto,
   first cam means along said track for engaging said tilting yoke and moving said yoke in one direction to tilt said tray to one side and pivot said yoke in the other direction to tilt said tray to the opposite side of said track, and latch means operable to hold said tray in normal upright position or to permit said tray to be tilted to one side or the other of said track, said carrier comprising a carriage, said latch means comprising an escapement member mounted for generally vertical movement on said carriage, second cam means along said track for selectively moving said escapement member, means yieldingly urging said escapement member to a neutral position corresponding to the upright position of said tray, and interengaging means between said escapement member and said tray such that when said escapement member is in neutral position, said tray is maintained in upright position, when said escapement member is moved in one direction, said tray is permitted to tilt to one side of the track, and when said escapement member is moved in the other directioin from neutral, the tray is permitted to tilt to the opposite side of the track.

2. The combination set forth in claim 1 wherein said interengaging means comprises a member mounted on one of said carriage and tray having a generally vertical portion and oppositely extending generally horizontal portions and a pair of pins mounted on the other of said carriage and tray, said pins being positioned such that when the escapement member is in neutral position, one of said pins is on one side of said central portion and the other of said pins is on the opposite side of said central portion of said escapement member, and when the escapement member is moved in one direction, one of said pins is out of engagement with said central portion, and when said escapement member is moved in the opposite direction from neutral, the other of said pins is out of engagement with said central portion so that said tray may swing to one side or the other of the track.

3. The combination set forth in claim 2 wherein said escapement member is on said carriage and said pins are on said yoke of said tray.

4. The combination set forth in claim 3 including a lever pivoted about a horizontal axis to said carriage and having one end thereof engaging said escapement member and the other end thereof having means thereon for engaging said second mentioned cam means along the track.

5. For use in a tilting tray sorting conveyor, a carrier adapted to move along a track, said carrier having a tray pivotally mounted thereon about a longitudinal axis, said tray having a tilting yoke fixed thereto and adapted to engage first cam means along a track for engaging said tilting yoke and moving said yoke in one direction to tilt said tray to one side and pivot said yoke in the other direction to tilt said tray to the opposite side of said track, and latch means operable to hold said tray in normal upright position or to permit said tray to be tilted to one side or the other of said track, said carrier comprising a carriage, said latch means comprising an escapement member mounted for generally vertical movement on said carriage and adapted to be moved by cam means along a track, means yieldingly urging said escapement member to a neutral position corresponding to the upright position of said tray, and interengaging means between said escapement member and said tray such that when said escapement member is in neutral position, said tray is maintained in upright position, when said escapement member is moved in one direction, said tray is permitted to tilt to one side of the track, and when said escapement member is moved in the other direction from neutral, the tray is permitted to tilt to the opposite side of the track.

6. The combination set forth in claim 5 wherein said interengaging means comprises a member having a generally vertical portion and oppositely extending generally horizontal portions and a pair of pins mounted on the other of said carriage and tray, said pins being positioned such that when the escapement member is in neutral position, one of said pins is on one side of said central portion and the other of said pins is on the opposite side of said central portion of said escapement member, and when the escapement member is moved in one direction, one of said pins is out of engagement with said central portion, and when said escapement member is moved in the opposite direction from neutral, the other of said pins is out of engagement with said central portion so that said tray may swing to one side or the other of the track.

7. The combination set forth in claim 6 wherein said escapement member is on said carriage and said pins are on said yoke of said tray.

8. The combination set forth in claim 7 including a lever pivoted about a horizontal axis to said carriage and having one end thereof engaging said escapement member and the other end thereof having means thereon for engagement by cam means along a track.

* * * * *